Feb. 13, 1923.

W. E. OWEN 1,445,548

FOOT REST FOR SHOVELS AND THE LIKE

Filed Oct. 11, 1921

Inventor
W. E. Owen

By
Geo. P. Kimmel, Attorney

Patented Feb. 13, 1923.

1,445,548

UNITED STATES PATENT OFFICE.

WALTER E. OWEN, OF CHILLICOTHE, OHIO.

FOOT REST FOR SHOVELS AND THE LIKE.

Application filed October 11, 1921. Serial No. 506,999.

*To all whom it may concern:*

Be it known that I, WALTER E. OWEN, a citizen of the United States, residing at Chillicothe, in the county of Ross and State of Ohio, have invented certain new and useful Improvements in Foot Rests for Shovels and the like, of which the following is a specification.

This invention relates to attachments for shovels and spades.

The object of the invention is to provide a device for attachment to a spade or shovel handle to provide a foot rest to force the blade into the earth when excavating in a ditch or hole.

Another object is to so construct a device of this character that it may be quickly moved from one position to another and secured with the exertion of very slight effort and which is strong and durable and capable of withstanding all strains to which it may be subjected.

With these and other objects in view, the invention consists in certain novel features of construction as hereinafter shown, described and claimed.

In the accompanying drawing:—

Figures 1, 2, 3:
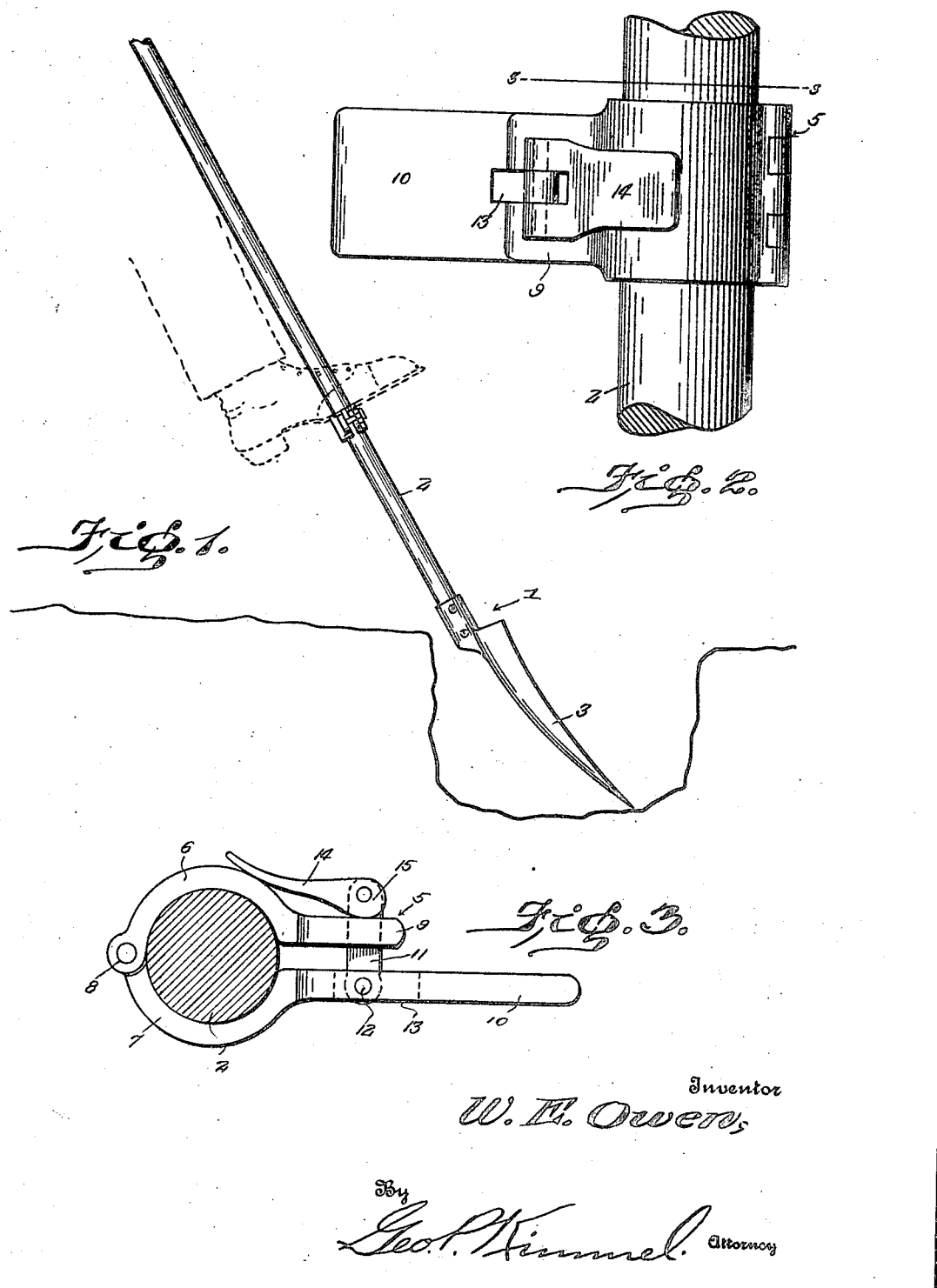
Figure 1 represents a side elevation of a shovel with this improved attachment shown applied and the foot of the user in dotted lines in operative position thereon.
Fig. 2 is an enlarged front elevation of the attachment attached to the handle of the shovel to which it is applied being shown broken off and in section.
Fig. 3 is a transverse section taken on the line 3—3 of Fig. 2 showing the attachment in top plan view.

In the embodiment illustrated a shovel 1 of ordinary construction is shown, provided with the usual handle 2 and blade 3.

The foot rest 5 constituting this invention is shown applied to the handle 2 and comprises two jaws 6 and 7 shaped to conform to the handle 2 in connection with which it is to be used, being here shown semi-circular in configuration and pivotally connected at one end as shown at 8. These jaws 6 and 7 are provided at their free ends with laterally extending arms 9 and 10 arranged in parallel relation to each other the arm 9 carried by jaw 6 being shorter than arm 10 and bifurcated at its free end for a purpose presently to be described.

The longer arm 10 is slotted as shown at 13 and in said slot is mounted one end of a bar 11 which is pivoted between the members of the slot as shown at 12 said bar being inserted between the furcations of the arm 9 and projecting beyond said arm. To the free end of the bar 11 is pivoted a lever 14 having a cam 15 at its inner end which is designed to engage the outer face of arm 9 when in locking position and clampingly connect the jaws 6 and 7 in engagement with the handle 2 of the shovel in connection with which the device is to be used.

The arm 10 of the jaw 7 projects some distance beyond the arm 9 and is designed to form the foot rest proper so that force may be exerted by the user when digging in the bottoms of ditches, holes and the like as is shown in Fig. 1, it being obvious that the rest 5 may be positioned at any desired location on the handle 2 according to the depth of the ditch being dug.

In the use of this attachment the cam lever 14 is swung forwardly to release the jaws 6 and 7 and the device is slipped longitudinally on the handle 2 until it reaches the desired position when said lever 14 is swung inwardly into position shown in Figs. 2 and 3 and thereby clampingly engaged with the handle 2 ready for use.

From the above description it will be obvious that this foot rest may be quickly clamped and unclamped from the handle 2 and positioned where desired thereon so that the proper force may be exerted on the blade 3 of the shovel in ditches and the like.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. A foot rest for shovels comprising a pair of clamping jaws shaped to conform to the handle in connection with which they are to be used and pivotally connected at one end, the other end of said jaws having laterally extending arms, and a lever and link connection for clampingly connecting said arm to engage said jaws with the handle in connection with which the device is to be used.

2. A foot rest for shovels comprising a pair of handle connecting jaws pivotally connected at one end and provided at their other ends with laterally extending arms, one of said arms being longer than the other, a link or bar pivoted at one end to one of said arms and engaged with the other arm, and projecting beyond said arm, and a cam lever carried by said link and adapted to lockingly engage said arms to force them toward each other and clamp the jaws to the handle in connection with which the device is to be used.

In testimony whereof, I affix my signature hereto.

WALTER E. OWEN.